(12) United States Patent
Tang

(10) Patent No.: US 6,202,166 B1
(45) Date of Patent: Mar. 13, 2001

(54) STATE MACHINE WITH A DYNAMIC CLOCK GATING FUNCTION

(75) Inventor: Chung-Wen Tang, Miao-Li (TW)

(73) Assignee: Integrated Technology Express Inc., Hsinchu (TW)

( * ) Notice: Subject to any disclaimer, the term of this patent is extended or adjusted under 35 U.S.C. 154(b) by 0 days.

(21) Appl. No.: 09/186,532

(22) Filed: Nov. 5, 1998

(30) Foreign Application Priority Data

Jul. 29, 1998 (TW) .................................. 87112423

(51) Int. Cl.[7] .................................................. G06F 1/12

(52) U.S. Cl. .............................. 713/500; 713/600

(58) Field of Search ............................. 713/500, 501, 713/600, 320

(56) References Cited

U.S. PATENT DOCUMENTS

| | | | |
|---|---|---|---|
| 5,461,649 | * 10/1995 | Bailey et al. | 327/28 |
| 5,463,655 | * 10/1995 | Llewellyn | 375/359 |
| 5,949,266 | * 9/1999 | Hinds et al. | 327/208 |
| 5,974,555 | * 10/1999 | Nakayama | 713/322 |
| 5,994,935 | * 11/1999 | Ueda et al. | 327/202 |

* cited by examiner

Primary Examiner—Thomas Lee
Assistant Examiner—Nitin Patel
(74) Attorney, Agent, or Firm—Jiawei Huang; J.C. Patents

(57) ABSTRACT

A state machine with a dynamic clock gating function according to the invention is disclosed. In the state machine, a gating clock control logic is used to gate a clock signal input to flip-flops which do not need a clock sample input. Accordingly, the total capacitance of capacitors which are charged/discharged following the state transition of a clock signal is greatly reduced, thereby decreasing the power consumption of the state machine.

6 Claims, 2 Drawing Sheets

STATE MACHINE WITH A DYNAMIC CLOCK GATING FUNCTION

CROSS-REFERENCE TO RELATED APPLICATION

This application claims the priority benefit of Taiwan application serial no. 87112423, filed Jul. 29, 1998, the full disclosure of which is incorporated herein by reference.

BACKGROUND OF THE INVENTION

1. Field of the Invention

The invention relates to a state machine, and in particular to a state machine with a dynamic clock gating function, leading to a low power consumption.

2. Description of the Related Art

As shown in FIG. 1a, a traditional state machine includes a next state logic 10 and a current state logic 12. The current state logic 12 consists of a plurality of flip-flops. A clock signal is directly inputted to the clock input terminal of each flip-flop. Thus, the total power consumption caused by a state transition of the clock signal is estimated by the following formula:

$$\Sigma \tfrac{1}{2} C_{Li} V^2 f_i$$

where the $C_{Li}$ is a total capacitance of all capacitors which are charged/discharged in the current state logic 12 following the state transition of the clock signal with a frequency of $f_i$.

As an example, a traditional resettable D-type flip-flop is shown in FIG. 2.

In FIG. 2, an inverter 20 receives an external clock signal CK and then transmits a transfer control signal CKB. The transfer control signal CKB is reverted into a complementary transfer control signal $\overline{CKB}$ by an inverter 22, wherein the transfer control signal CKB and the complementary transfer control signal $\overline{CKB}$ are used to control the on/off states of a CMOS transmission gate.

When the external clock signal CK is at a low logic level, the transfer control signal CKB is at a high logic level and the complementary transfer control signal $\overline{CKB}$ is at a low logic level. At this point, transmission gates 24 and 26 are closed while transmission gates 28 and 30 are open. On the other hand, when the external clock CK is at a high logic level, the transfer control signal CKB is at a low logic level and the complementary transfer control signal $\overline{CKB}$ is at a high logic level. At this time, the transmission gates 24 and 26 are open while the transmission gates 28 and 30 are closed. In line with the state transition of the clock signal between the high and low logic levels, capacitors, including the input and output capacitor of the inverters 20 and 22 and the input capacitors of the transmission gates 24, 26, 28 and 30, are charged/discharged, causing a power consumption. No matter at which state the state machine is, the power consumption remains constant even if the state machine is at an idle state. This causes a problem of an excess power consumption.

SUMMARY OF THE INVENTION

In view of the above, an object of the invention is to provide a state machine with a dynamic clock gating function for resolving the problem of an excess power consumption as stated in the prior art.

To attain the above-mentioned object, the state machine with a dynamic clock gating function according to the invention at least includes a next state logic, a plurality of flip-flops, a plurality of OR gates and a gating clock control logic. The next state logic is used to output a next state. The data input terminal of each flip-flop is electrically coupled to the output terminal of the next state logic while the data output terminal of each flip-flop is electrically coupled to the input terminal of the next state logic. The flip-flops are combined to obtain a current state. A first input terminal of each OR gate receives an external clock signal while the output terminal of each OR gate is electrically coupled to the clock input terminal of a corresponding flip-flop. The input terminal of the gating clock control logic is electrically coupled to the data output terminal of each flip-flop while the output terminal of the gating clock control logic is electrically coupled to a second input terminal of each OR gate. The gating clock control logic judges whether to gating the clock signal of each flip-flop based on the current state.

Accordingly, in the state machine with a dynamic clock gating function according to the invention, the gate clock control logic is used to gate a clock signal input to flip-flops which do not require a clock sample input. Thus, the capacitance of capacitors which are charged/discharged following the state transition of the clock signal is greatly reduced, thereby decreasing excess power consumption.

BRIEF DESCRIPTION OF THE DRAWINGS

The invention will be more fully understood from the detailed description given hereinbelow and the accompanying drawings, which are given by way of illustration only, and thus do not limit the present invention, and wherein.

DETAILED DESCRIPTION OF THE EMBODIMENTS.

Figure 1:
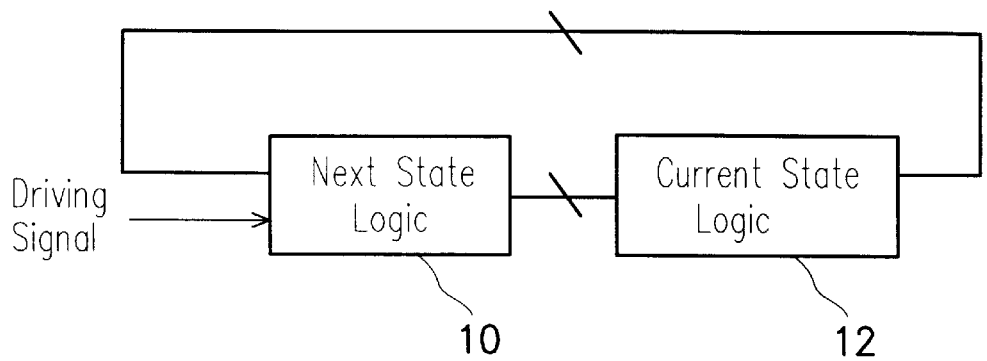
FIG. 1 is a block diagram showing a state machine according to the prior art.
Figure 2:
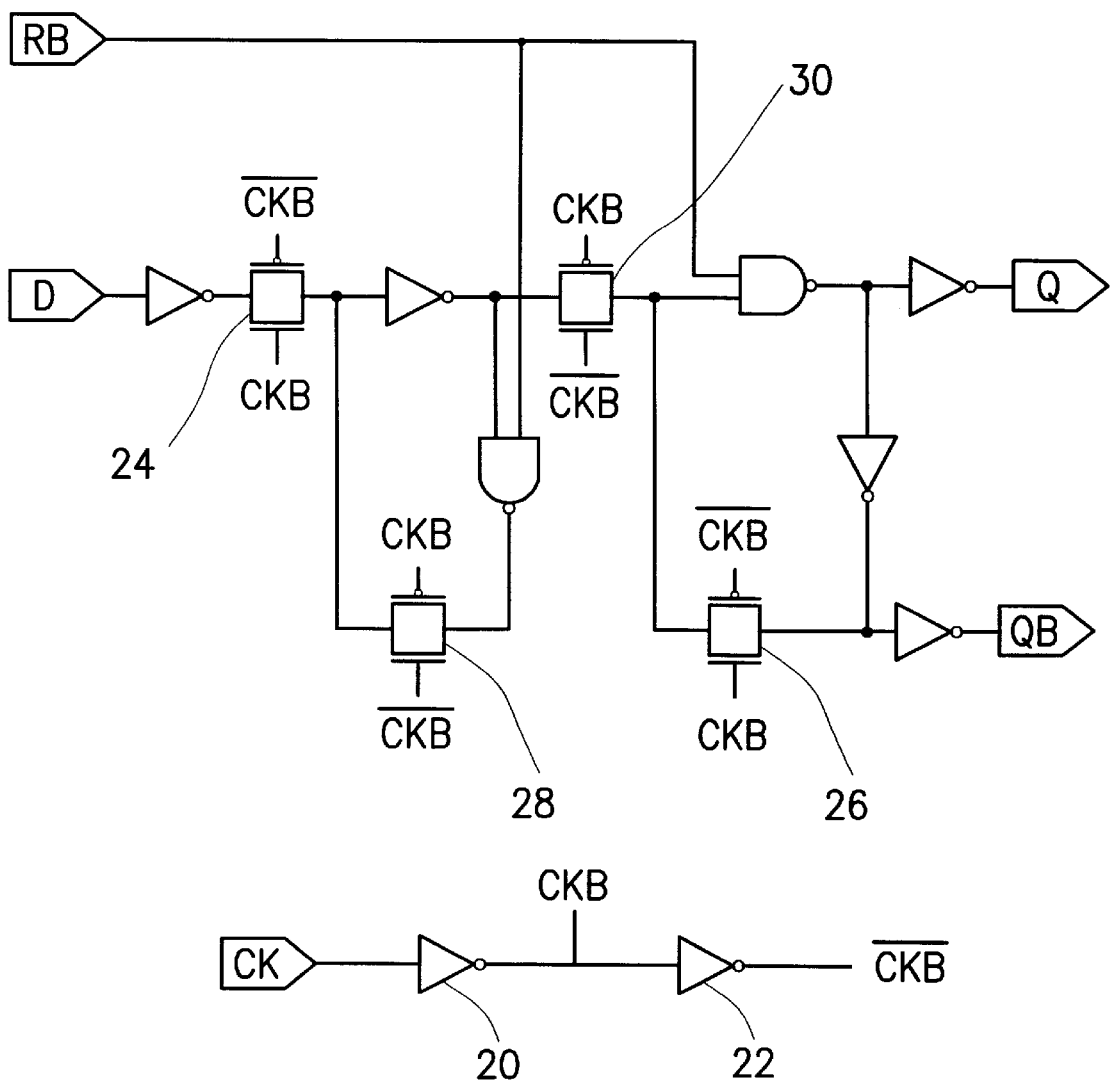
FIG. 2 is a circuit diagram showing a resettable D-type flip-flop according to the prior art.
Figure 3:
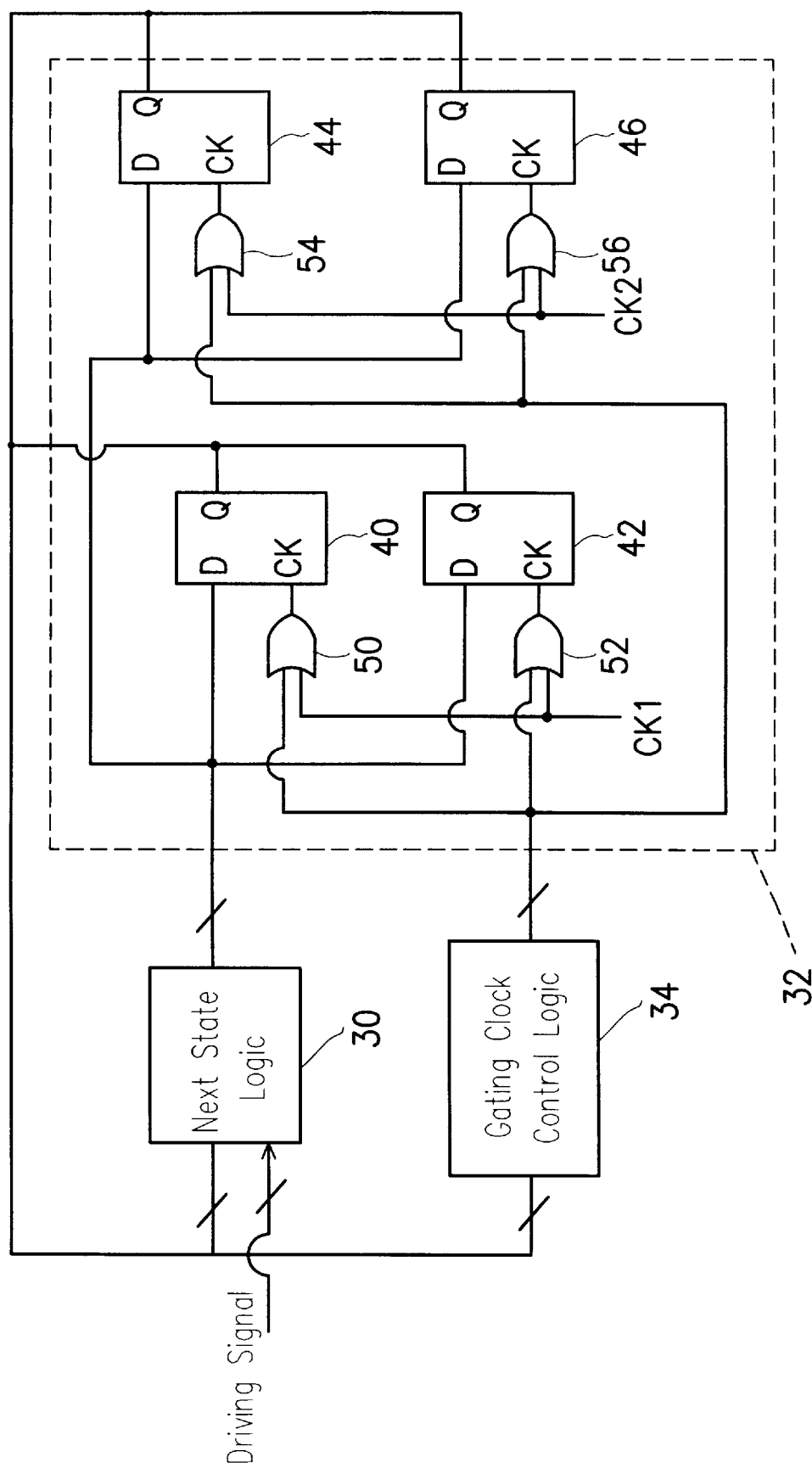
FIG. 3 is a circuit diagram showing a state machine with a dynamic clock gating function according to a preferable embodiment of the invention.

Referring to FIG. 3, a state machine with a dynamic clock gating function according to a preferable embodiment of the invention is shown. The state machine of the invention includes a next state logic 30, a current state logic 32 and a gating clock control logic 34. The current state logic 32 includes 4 flip-flops 40, 42, 44 and 46.

In the state machine, the data input terminals D of the flip-flops 40, 42, 44 and 46 are electrically coupled to the output terminal of the next state logic 30 while the data output terminals Q thereof are electrical coupled to the input terminals of the next state logic 30 and the gating clock control logic 34. Furthermore, the second input terminals of each of OR gates 50 and 52 are electrically coupled to the output terminal of the gating clock control logic 34 and the first input terminals of each of OR gates 50 and 52 receives an external clock signal CK1. The output terminals of the OR gates 50 and 52 are electrically coupled to the clock input terminals CK of the flip-flops 40 and 42, respectively. Similarly, the input terminals of each of OR gates 54 and 56 are electrically coupled to the output terminal of the gating clock control logic 34 and the second input terminals of each of OR gates 54 and 56 receives an external clock signal CK2. The output terminals of the OR gates 54 and 56 are electrically coupled to the clock input terminals CK of the flip-flops 44 and 46, respectively. Alternatively, the above-mentioned OR gates can be thoroughly replaced with AND gates.

Assume that the current state of the current state logic 32 is "0000." That is, the states of the flip-flops 40, 42, 44 and 46 are all at a low logic level "0." When inputting the external clock signals CK1 and CK2, the gating clock control logic 34 judges which flip-flops' clock signals need to be gated if the current state is changed from "0000" into "0001". In this case, since the states of the flip-flops 40, 42, 44 still remain at a low logic level "0", and the state of the flip-flop 46 is changed into a high logic level "1", the clock signals of the flip-flops 40, 42 and 44 can be gated. Therefore, the gating clock control logic 34 transmits a signal with a high logic level "1" to the input terminals of the OR gates 50, 52 and 54 corresponding to the flip-flops 40, 42 and 44. Thus, the clock input terminals of the flip-flops 40, 42 and 44 are maintained at a high logic level. That is, the clock input terminals of the flip-flops 40, 42 and 44 do not vary with the state transition of the external clock signals CK1 and CK2. As a result, the flip-flops 40, 42 and 44 have no power consumption during this time.

On the other hand, if the current state logic only changes between states "0001" and "0000", the OR gates 50, 52 and 54 can be replaced with just one OR gate. For example, the OR gates 52 and 54 are removed while the OR gate 50 remains, and the output terminal of the OR gate 50 is further electrically coupled to the clock input terminals CK of the flip-flops 42 and 44. At this time, when the OR gate 50 receives a gating signal from the gating clock control logic 34, the OR gate 50 concurrently controls the clock input terminals CK of the flip-flops 40, 42 and 44 to remain at a high logic level. Thus, the flip-flops 40, 42 and 44 have no power consumption therein.

As described above, when the current state logic changes from a state to another state, only some of the flip-flops need to change their own output data while the other parts thereof do not require a clock sample input. In the state machine, a gating clock control logic is used to gate a clock signal input to flip-flops which do not require a clock sample input.

In summary, in the state machine of the invention, a gating clock control logic is used to gate a clock signal input to flip-flops which do not require a clock sample input. Accordingly, the capacitance of capacitors which are charged/discharged following the state transition of the clock signal is greatly reduced, thereby decreasing the power consumption.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A state machine with a dynamic clock gating function, comprising:

a next state logic for outputting a next state;
   a plurality of flip-flops, of which each data input terminal is electrically coupled to the output terminal of the next state logic and each data output terminal is electrically coupled to the input terminal of the next state logic, for providing a current state;
   a plurality of OR gates, of which each first input terminal receives an external clock signal and each output terminal is electrically coupled to the clock input terminal of a corresponding flip-flop; and
   a gating clock control logic, of which the input terminal is electrically coupled to the data output terminals of the flip-flops and the output terminal is electrically coupled to the second input terminals of the OR gates, for judging whether to gate the clock signal of the flip-flops based on the current state and the next state.

2. The state machine as claimed in claim 1, wherein the OR gates can be replaced with AND gates.

3. A state machine with a dynamic clock gating function, comprising:

a next state logic for outputting a next state;
   a plurality of first flip-flops, of which each data input terminal is electrically coupled to the output terminal of the next state logic and each data output terminal is electrically coupled to the input terminal of the next state logic;
   a plurality of second flip-flops, of which each data input terminal is electrically coupled to the output terminal of the next state logic and each data output terminal is electrically coupled to the input terminal of the next state logic, for providing a current state together with the first flip-flops;
   a plurality of first OR gates, of which each first input terminal receives a first external clock signal and each output terminal is electrically coupled to the clock input terminal of each corresponding first flip-flop;
   a plurality of second OR gates, of which each first input terminal receives a second external clock signal and each output terminal is electrically coupled to the clock input terminal of each corresponding second flip-flop; and
   A gating clock control logic, of which the input terminal is electrically coupled to the data output terminals of the first and second plurality of flip-flops and the output terminal is electrically coupled to the second input terminals of the first and second plurality of OR gates, for judging whether to gate the clock signal of the first and second plurality of flip-flops based on the current state.

4. The state machine as claimed in claim 3, wherein the OR gates can be replaced with AND gates.

5. A state machine with a dynamic clock gating function, comprising:

A next state logic for outputting a next state;
   A plurality of first flip-flops, of which each data input terminal is electrically coupled to the output terminal of the next state logic and each data output terminal is electrically coupled to the input terminal of the next state logic;
   A plurality of second flip-flops, of which each data input terminal is electrically coupled to the output terminal of the next state logic and each data output terminal is electrically coupled to the input terminal of the next state logic, for providing a current state together with the first flip-flops;
   At least an OR gate, of which the first input terminal receives a first external clock signal and the output terminal is electrically coupled to the clock input terminals of the first flip-flops;
   A plurality of second OR gates, of which each first input terminal receives a second external clock signal and each output terminal is electrically coupled to the clock input terminal of a corresponding second flip-flop; and A gating clock control logic, of which the input terminal is electrically coupled to the data output terminals of the first and second plurality of flip-flops and the output terminal is electrically coupled to the second input terminals of the OR gates, for judging whether to gate the clock signal of the first and second plurality of flip-flops based on the current state.

6. The state machine as claimed in claim 5, wherein OR gates can be replaced with AND gates.

* * * * *